US005619727A

United States Patent [19]
Chen et al.

[11] Patent Number: 5,619,727
[45] Date of Patent: Apr. 8, 1997

[54] APPARATUS FOR A MULTIPLE CHANNEL DIRECT MEMORY ACCESS UTILIZING A VIRTUAL ARRAY TECHNIQUE

[75] Inventors: Chang-Shan Chen, Taipei; Yung-Cha Dung, Hsin-Chu, both of Taiwan

[73] Assignee: United Microelectronics Corp., Hsin-Chu, Taiwan

[21] Appl. No.: 400,915

[22] Filed: Mar. 8, 1995

[51] Int. Cl.$^6$ ........................................................ G06F 3/04
[52] U.S. Cl. .......................... 395/842; 395/847; 395/848; 395/200.07; 395/844; 395/293; 395/287
[58] Field of Search ................................. 395/842, 847, 395/848, 200.07, 844, 293, 287

[56] References Cited

U.S. PATENT DOCUMENTS 4,514,808  4/1985  Murayama et al. .

OTHER PUBLICATIONS

"Direct Memory Access Controller (DMAC) Advance Information" by Motorola Semiconductor Technical Data MC8450, Motorola Inc., 1986, pp. 5–1 through 5–21.
"The Indispensible PC Hardware Book, Your Hardware Questions Answered" by Hans–Peter Messmer, 1994, pp. 376–393.

*Primary Examiner*—Jack B. Harvey
*Assistant Examiner*—Rupal D. Dharia
*Attorney, Agent, or Firm*—Barnes, Kisselle, Raisch, Choate, Whittemore & Hulbert, P.C.

[57] ABSTRACT

An apparatus for multiple channel direct memory access using a virtual array technique comprises n DMA blocks connected in series, each DMA having m independent channels for transferring data. Parameters to control a DMA transfer, such as a source address, destination address, length, and an action mode value, are stored in a memory for each one of the m DMA channels. The first dimension DMA is coupled to the memory to retrieve the parameters and is set in a series mode, while a downstream DMA is set in a normal mode. Operation of the apparatus is begun by starting the first dimension DMA, which then acquires control of the system bus. The first dimension DMA then reads and transfers the DMA parameters to the higher dimension, downstream, DMAs, which preempt control of the system bus away from the first dimension DMA through a multi-layer bus arbiter until the higher dimension DMA transfer is complete. Control of the system bus is then restored to the first dimension DMA.

10 Claims, 6 Drawing Sheets

APPARATUS FOR A MULTIPLE CHANNEL DIRECT MEMORY ACCESS UTILIZING A VIRTUAL ARRAY TECHNIQUE

FIELD OF THE INVENTION

The present invention generally relates to an apparatus for a multiple channel direct memory access and more particularly, relates to an apparatus for a multiple channel direct memory access by a virtual array technique.

BACKGROUND OF THE INVENTION

In a conventional direct memory access (DMA) apparatus, only a limited number of channels are available. In order to provide multiple m-channels, the DMA apparatus must be equipped with complicated circuitry. Moreover, even multiple channel DMA devices can only implement transfers from a single I/O device or memory to multiple I/O devices/memories, or, from multiple I/O devices/memories to a single I/O device or memory such as in a Motorola MC68450. Conventional DMA structures cannot perform transfers from multiple sources to multiple destinations; this is an undesirable limitation.

It is therefore an object of the present invention to provide an apparatus for a multiple channel direct memory access that does not have the shortcomings of the prior art devices.

It is another object of the present invention to provide an apparatus for multiple channel direct memory access by utilizing a virtual array technique.

It is a further object of the present invention to provide an apparatus for a multiple channel direct memory access by utilizing a virtual array technique of simple circuitry to achieve the functions of a channel DMA.

SUMMARY OF THE INVENTION

In accordance with the present invention, an apparatus for a multiple channel direct memory access by utilizing a virtual array technique is provided.

In a preferred embodiment, the present invention utilizes a simple circuit to achieve the functions of an m-channel DMA. Any single memory device or I/O device can be used as a source for transfers to any other single memory device or I/O device as a destination. The inventive apparatus for performing multiple channel direct memory access data transfers in a system of the type having a bus comprises three basic functional blocks, including a first direct memory access (DMA) means, a second DMA means being operatively coupled in series or cascaded to the first DMA means, and a multi-layer bus arbiter. The first DMA means is provided for transferring data from a first data source to a first data destination. The first DMA means further including means for generating a first bus request signal in response to a first starting condition. The second DMA means has associated therewith a plurality of channels for transferring data from a second data source to a second data destination. The first DMA means further includes means for addressing the second DMA means when the first DMA means is in a series mode. The second DMA means generates a second bus request signal in response to a second start condition. The second bus request signal has a higher bus priority than the first bus request signal; however, this is only arbitrary, and is programmable through the bus arbiter.

The multi-layer bus arbiter is responsive to the first and second bus request signals and is provided in the present invention for generating a bus enable signal corresponding to the highest priority bus request signal currently asserted. The bus enable signal enables the corresponding DMA to obtain a system bus control right. The first DMA means further includes means for transferring DMA parameters stored in the first data source, which is preferably a memory, to the second DMA means for storage therein for control. The transfer of certain DMA parameters to the second DMA means placing the second DMA in a normal mode and establishing the second starting condition, wherein the bus arbiter enables the second DMA means to acquire the system bus control right for completing a direct memory access data transfer in accordance with the transferred DMA parameters.

In an alternate embodiment, the first DMA means also has associated therewith m-channels to form an n-dimensional m-channel DMA function apparatus, wherein n is the number of independent DMAs and n and m are any integer.

BRIEF DESCRIPTION OF THE DRAWINGS

Other objects, features and advantages of the present invention will become apparent upon consideration of the specification and the appended drawings in which.

DETAILED DESCRIPTION OF THE PREFERRED EMBODIMENTS

The present invention is a virtual array type direct memory access (DMA) apparatus, and is most suitably adapted for use in systems where it is desirable to have multiple channels, but where, however, the total number of channels required is uncertain. Furthermore, the source and object (or destination) for each single channel can be any single memory device or I/O device, or it can also be grouped into an n-dimensional m-channel DMA. In conventional technology, for instance, in a UM 8237 made by United Microelectronics Inc., there is not unlimited channel function.

Further, in a Motorola MC68450, the function of an m-channel DMA using a stored array is provided; however, it can only be used for transfers from a single memory or I/O device to multiple sources, or, from multiple sources to a single memory device or I/O device, such that the functions of a virtual m-channel DMA able to make transfers from multiple sources to multiple destinations cannot be achieved.

The present invention uses n independent DMA's, a multiple layer bus arbiter, and at least one set of memory devices and/or I/O devices, to achieve the functions of an n-dimensional, m-channel DMA using a virtual array technique. In the illustrated embodiment, each dimensional DMA has a different bus priority order, the higher dimensional DMA has the highest priority order, for instance, $DMA_n > \ldots > DMA_4 > DMA_3 > DMA_2 > DMA_1$. A high priority DMA can interrupt at any time a lower priority DMA such that the system bus control right is surrendered by the lower priority DMA to the high priority DMA. This priority system does not work in a reverse order. The present invention requires the start up of a lower-dimensional DMA first, which in turn starts the higher-dimensional DMA.

Figure 1:
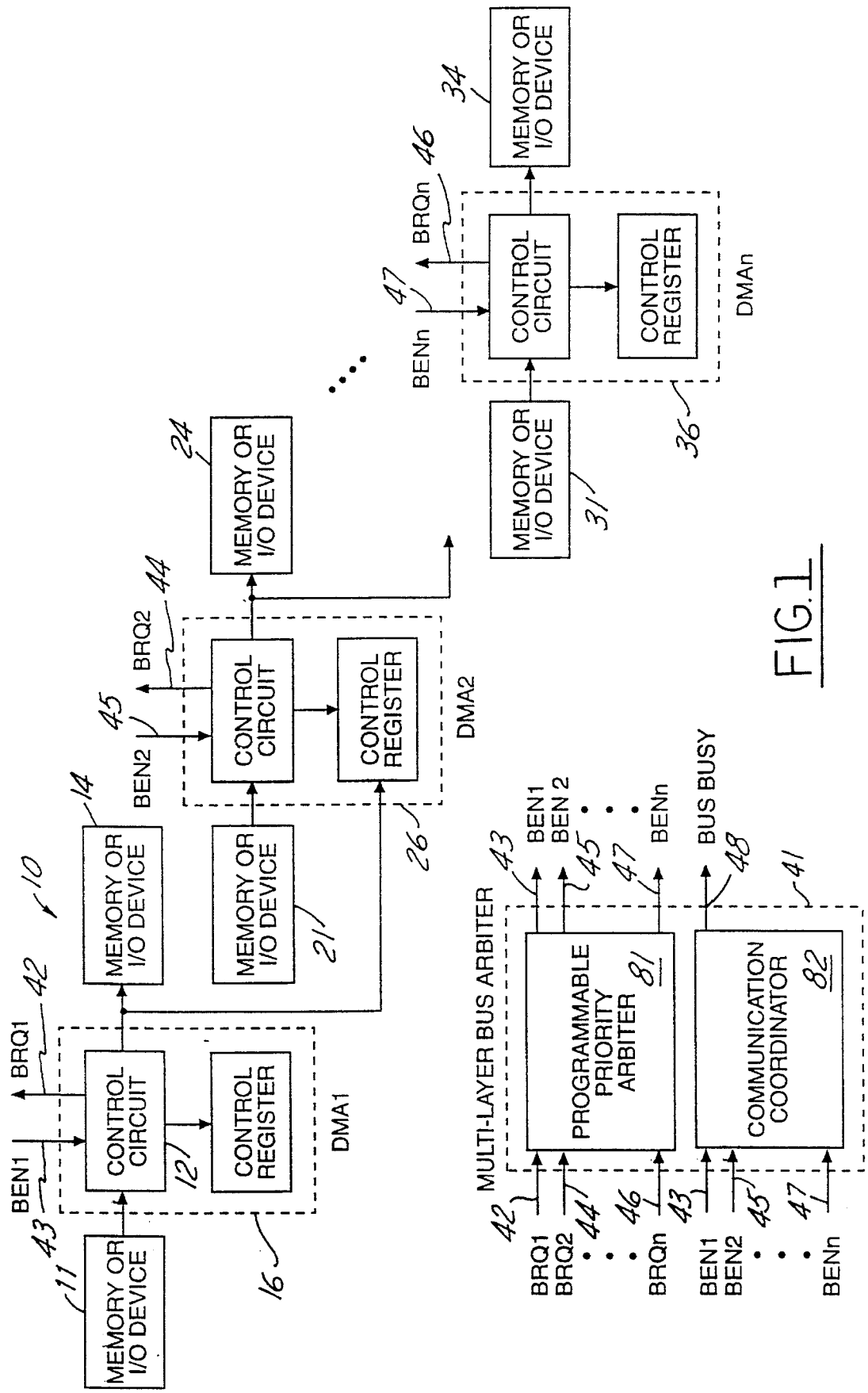
FIG. 1 is a block diagram showing a one-dimensional m-channel DMA embodiment of the present invention formed by two independent DMA structures connected in series, including a multi-layer bus arbiter.

Before proceeding to a detailed description of DMA apparatus 10 shown in FIG. 1, a description of DMA transfers, in general, will be set forth. Basic channel operation of a DMA structure requires that several parameters, such as a source address, a destination address, a transfer length, and certain control parameters, first be initialized for that channel. This initialization can be performed by a Central Processing Unit (CPU) or other bus master over the System Bus to which the DMA structure is coupled. After initialization, the channel can be activated or started to operate in two operating or action modes. The first mode is characterized by an internally (i.e., internal to the DMA structure) generated starting signal or condition directly established by the CPU or other bus master (e.g., by setting a starting bit in a control register). The second mode is characterized by an externally generated starting signal or condition (e.g., interrupt signal arising from a peripheral circuit) after the DMA has been appropriately initialized by a CPU or other bus master. The present invention relates to and utilizes the first operating mode.

FIG. 1 shows a 1-dimensional m-channel DMA 10. The 1-dimensional m-channel DMA 10 is constructed by using two independent DMA structures $DMA_1$ 16 and $DMA_2$ 26 connected in series or cascaded. $DMA_1$ 16 and $DMA_2$ 26 are coupled to a system bus (not illustrated), control of which is determined by multi-layer bus arbiter 41. The bus priority for $DMA_2$ 26 is preferably higher than that for $DMA_1$ 16.

$DMA_1$ 16 is operable to transfer data from a first data source 11, to a first data destination 14. Preferably, first data source 11 comprises a memory or I/O device operatively coupled to $DMA_1$ 16. Similarly, first data destination 14 also is preferably a memory or I/O device. $DMA_1$ 16 further includes means for generating a first bus request signal $BRQ_1$ 42. Signal 42 is used to request control of the system bus from a central processing unit (CPU) or another bus master using bus arbiter 41. This system bus control right (i.e., the right to use and control the system bus to the exclusion of other potential bus masters) is awarded to $DMA_1$ 16 when $DMA_1$ 16 receives a bus enable signal $BEN_1$ 43. This signal informs $DMA_1$ 16 that the CPU (or other bus master) has released the bus, and that $DMA_1$ 16 is permitted or allowed to take over control of the bus to carry out a DMA type data transfer. $DMA_2$ 26 has associated therewith a plurality of channels (preferably m-channels, where m is an integer) for transferring data from second data source 21 to second data destination 24. As discussed above, preferably data source 21, and data destination 24 are a memory or I/O device. The $DMA_2$ 26 also includes means for generating a second bus request signal $BRQ_2$ 44 in response to a start condition.

It should be appreciated from FIG. 1 that n independent DMA structures may be connected in series to form a direct memory access structure having n-dimensions. As is shown in FIG. 1, $DMA_n$ 36 is provided for transferring data from an nth data source 31 to an nth data destination 34. $DMA_n$ 36 similarly includes means for generating a bus request signal $BRQ_n$ 46, and means for receiving a bus enable signal $BEN_n$ 47. In the illustrated configuration, $DMA_1$ 16 includes means for trigger starting other bus masters or DMAs downstream, while intermediate DMAs in the series-connected or cascaded array have means for being addressed by upstream $DMA_1$ 16 (to be trigger started by that DMA), and further to trigger start downstream DMA devices.

Figure 2:
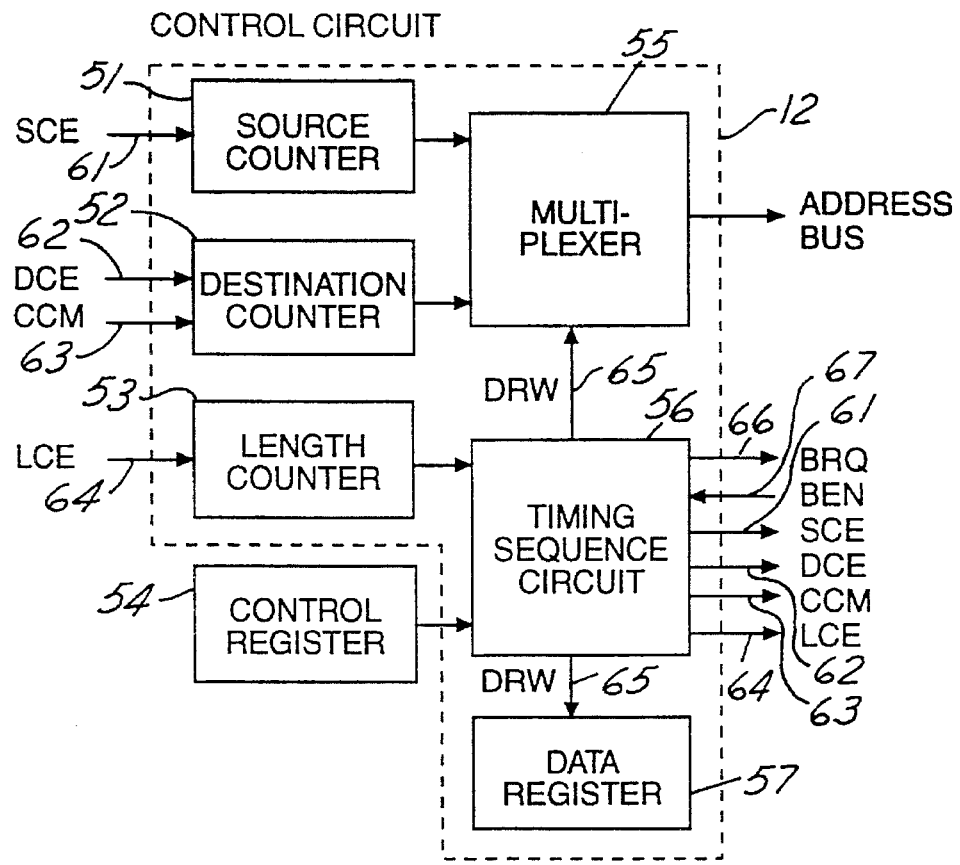
FIG. 2 is a partial block diagram illustrating a control register and a control circuit associated with the independent DMAs shown in FIG. 1.

As shown in FIG. 2, each independent DMA structure (e.g., $DMA_1$ 16, $DMA_2$ 26) preferably includes a control circuit 12 and a control register 54 coupled thereto. The control circuit 12 is provided for controlling the timing and operation of a DMA. The control register 54 is provided for storing control parameters for controlling the action mode of the DMA to cause the DMA to perform various, predetermined functions.

Referring to FIG. 2, the control circuit includes a source counter 51, destination counter 52, a length counter 53, a multiplexer 55, a timing sequence circuit 56, and a data register 57.

The source counter 51 is responsive to a source counter enable (SCE) signal 61 for providing a source address (via multiplexer 55 under control of timing sequence circuit 56) to the respectively connected data source, preferably a memory or I/O device through an address bus portion of the system bus. The destination counter 52 is responsive to a destination counter enable (DCE) signal 62 and a cascade mode enable (CCM) signal 63 for providing a destination address (via multiplexer 55) to a respectively connected data destination (or series connected DMA, to be described in further detail below), also through the address bus. Length counter 53 is responsive to a length counter enable (LCE) signal 64 for providing a count to aid in determining the amount of data to be transported or transferred by the DMA structure. When the length counter 53 completes its count (either up or down), the DMA structure may be programmed to automatically terminate the DMA data transfer operation to thereby automatically surrender ownership of the system bus control right.

Counters 51, 52, 53, and register 54 may be programmed or initialized to a respective predetermined value by a CPU or other bus master. Alternatively, the registers may be programmed or initialized by an upstream, cascaded DMA structure. For example, counters 51, 52, 53 and register 54 of $DMA_2$ 26 may be programmed by $DMA_1$ 16.

The SCE, DCE, LCE, and CCM signals are provided for controlling the operation of the corresponding counter. The SCE 61 signal is used to control the operation of the source counter 51 so that it counts up, counts down, or does not count. The DCE signal 62 is used to control the operation of the destination counter 52 so that it counts up, counts down, or does not count. The LCE signal 64 is used to control the operation of the length counter 53 so that it counts up, counts down, or does not count. The CCM signal 63 is used for operating the DMA in a normal mode or cascade (series) mode.

Timing sequence circuit 56 is responsive to the output of length counter 53 and the output of control register 54 to generate signal DRW 65 and for generating necessary timing and control signals to control read/write cycles of the DMA, as well as for generating a bus request signal and receiving a bus enable signal. The timing sequence circuit 56 thus provides the means for controlling data transfers from a data source to a data destination. Data register 57 is provided for temporarily storing data read by the DMA during a read cycle until a subsequent write cycle in which the stored data may be written to a memory or an I/O device.

The control register 54 includes a plurality of control bits for controlling the operation of the DMA structure associated therewith. Preferably, the control register includes a SCE bit, DCE bit, LCE bit, and a CCM bit for defining SCE signal 61, DCE signal 62, LCE signal 64, and CCM signal 63, respectively. Preferably, when the SCE bit is high, source register 51 counts up; when the DCE bit is high, destination register 52 counts up; when the LCE bit is high, the length register 53 counts down; and when the CCM bit is high, the DMA is in a cascade mode. In a cascade mode, the DMA is enabled to trigger start another DMA by writing or loading data (i.e., DMA configuration parameters that will control the operation of the DMA structure employed in the present invention) into the corresponding counters and registers of another, higher dimensional DMA. The control register 54 also includes a starting bit, which, when set, causes the DMA to request ownership of the system bus control right by generating a bus request signal (i.e., "start" a DMA data transfer cycle by requesting control of the system bus).

Figure 3:
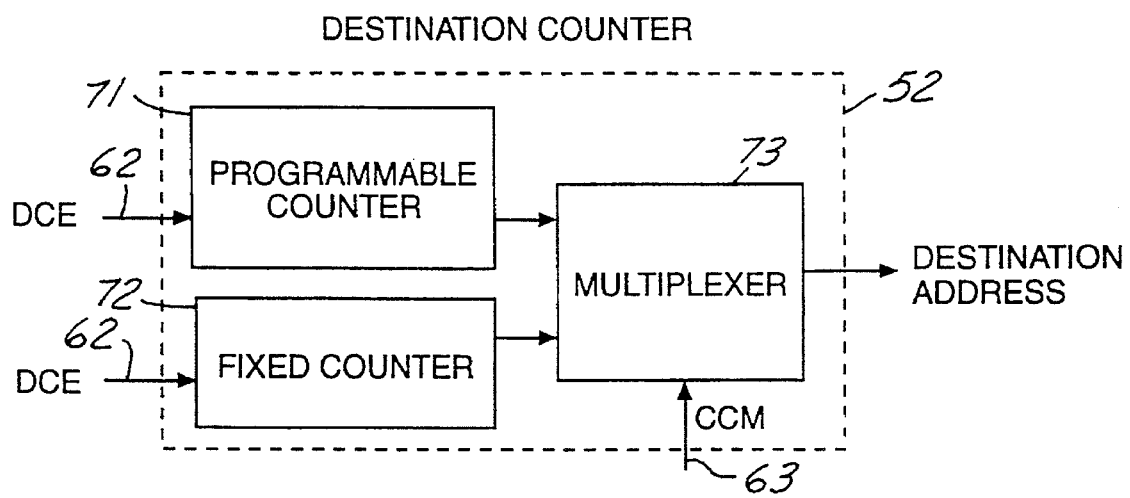
FIG. 3 is a partial block diagram illustrating a destination counter of the control circuit of FIG. 2.

Referring now to FIG. 3, the destination counter 52 includes a programmable counter 71, a fixed counter 72, and a multiplexer 73 adapted to select the output of either the programmable counter 71 or the fixed counter 72 based on the control signal CCM 63 generated by timing sequence circuit 56. Programmable counter 71, whose initial value may be programmed via a central processing unit (CPU), or other bus master, is used to generate data destination addresses for addressing data destination devices (i.e., memory or I/O devices 14, 24, ..., 34, as shown in FIG. 1) when the DMA is in a normal mode. On the other hand, fixed counter 72 is provided in the present invention for producing a destination address effective to address higher dimensional DMA structures. This address is selected by multiplexer 73 based on CCM 63 when the DMA is in a cascade mode. For example, fixed counter may be constructed using a divide-by-4 counter so that counter and register addresses for addressing downstream DMA counters and registers are properly generated and DMA parameters can be properly transferred thereby. It should be appreciated by one of ordinary skill in the art that the destination counter 52 comprises means to selectively address either a data destination, or the next-dimension independent DMA structure.

The present invention further includes a multi-layer bus arbiter 41 responsive to bus request signals $BRQ_1$ 42, $BRQ_2$ 44 ... $BRQ_n$ 46, for generating a bus enable signal corresponding to the highest priority input bus request signal. The multi-layer bus arbiter 41 activates a selected one of the bus enable lines (i.e., $BEN_1$, $BEN_2$ ..., $BEN_n$), the selected bus enable line indicating that the corresponding device (i.e, in the present invention, the corresponding DMA) is enabled to obtain the system bus control right.

Figure 4:
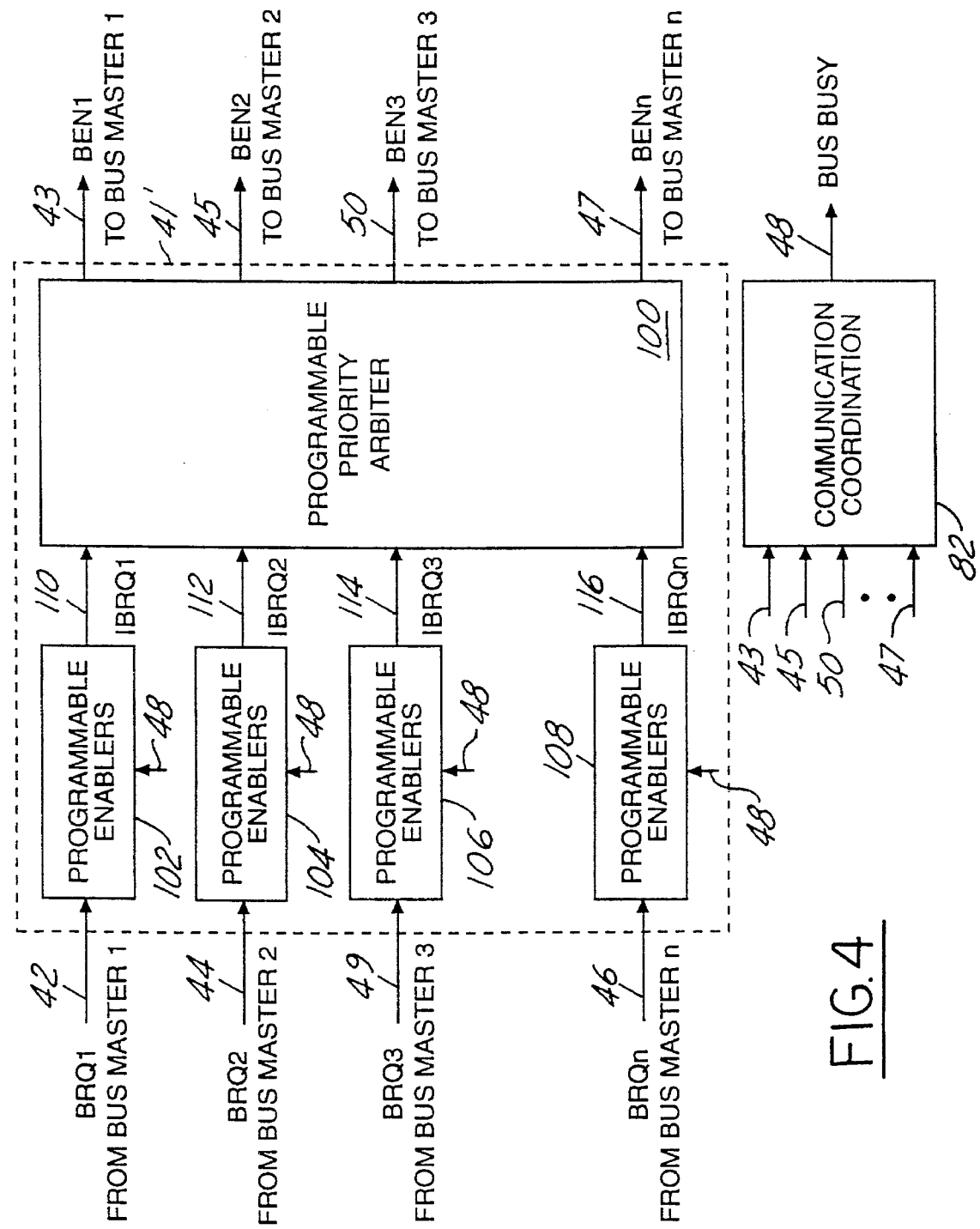
FIG. 4 is a partial block diagram view depicting in further detail the multi-layer bus arbiter shown in FIG. 1, and including enabler blocks, a priority arbiter, and a communication coordinator.

The multi-layer bus arbiter 41, depicted in FIG. 1 may take the form of multi-layer bus arbiter 41 shown in FIG. 4. Brief reference was earlier made to the basic function performed by multi-layer bus arbiter 41 in the present invention. Before proceeding to a description of the disclosed structure of bus arbiter 41', a general overview of the role the bus arbiter plays in the present invention will be set forth. In a conventional bus arbiter, when a bus master obtains the system bus, it retains control of the bus until it completes its tasks, when it releases the bus for acquisition by other bus masters. The conventional bus arbiter will then allow the next bus master to contend for the system bus control right, unless, of course, the contention time exceeds a preset time. In this case, the conventional bus arbiter will take back the system bus control right. The disclosed multi-layer bus arbiter allows a higher priority bus master to interrupt (or preempt), at any time, a lower priority bus master, and acquire the system bus control right for itself, without waiting for the lower priority bus master to first finish its tasks. This "preemption" function is especially important in real time systems, such as in video/image processing, sound processing, and interrupt service processing.

In a conventional bus arbiter, when the bus control right is distributed to any one bus master, it sends out a bus busy signal to inform the system and the other bus masters that the system bus control right has been acquired and, accordingly, not to send out a bus request, since any such bus request would not enable the requesting bus master to obtain the system bus control right. This lack of flexibility is often undesirable.

Proceeding now to a detailed description of the structure of bus arbiter 41', and referring to FIG. 4, multi-layer bus arbiter 41' comprises one or more programmable enablers 102, 104, 106 and 108, a programmable priority arbiter 100, and a communication coordinator 82.

The enablers 102, 104 and 106 are used to determine when any of the bus masters are occupying the system bus (i.e., through the bus busy signal), and whether (i.e., through appropriate programming of an associated mask register as described below) it should allow any other bus master to send out a bus request to the priority arbiter 100. The priority arbiter 100 determines the priority order of each bus master and further whether it should change the system bus control right and award it to another bus master, such that a programmable multi-layered bus control right transition effect can be achieved. The communication coordinator 82 is used to match the communication protocol of a system bus with arbiter 41'.

The multi-layer bus control right transition effect can be illustrated as follows. Assume that a DMA structure acquires the system bus, and is transporting a large volume of data. If there is a need to handle a task immediately, for instance, in the case of a sound processing operation where unless immediate attention is given to the operation the sound playback may be interrupted or cause a sound break or the appearance of noise, the multi-layer bus arbiter will allow such a transfer of the system bus control right from a relatively lower priority bus master (i.e., the data transfer relating to the large volume data transfer operation) to a relatively higher priority operation (i.e., the data transfer relating to the sound processing operation) bus master.

Figure 5:
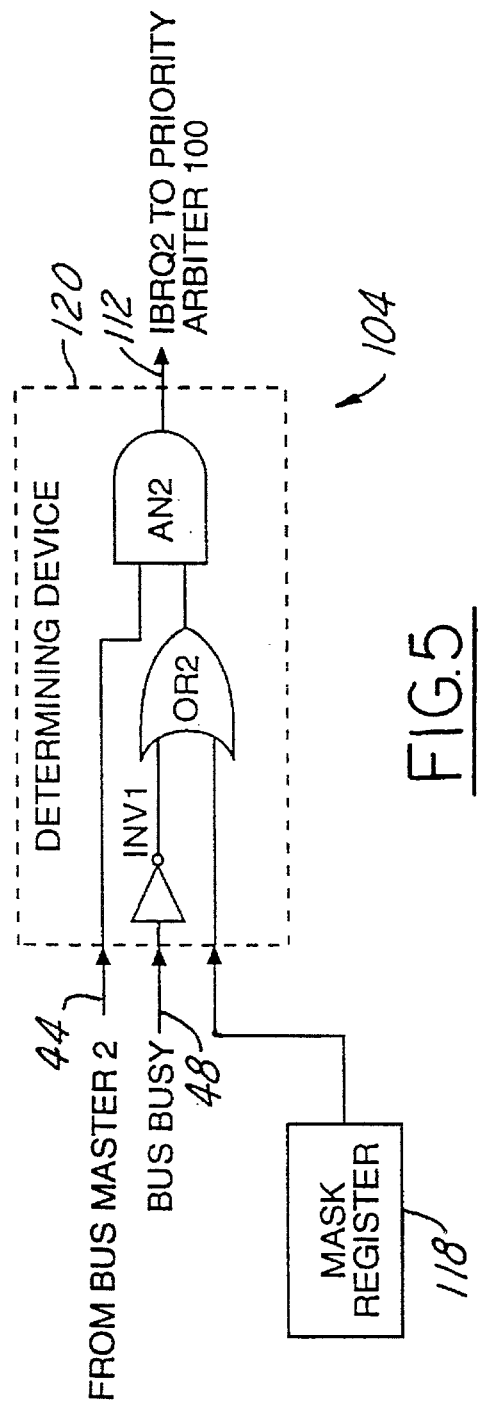
FIG. 5 is a partial schematic and block diagram view of an enabler shown in FIG. 4, particularly showing the enabler for bus master 2.

FIG. 5 shows an enabler, for example, enabler 104, in greater detail. Enabler 104 includes a mask register 118 coupled to a determining device 120. The mask register 118 can be set "on" or set "off." When the register is set "on," the enabler will allow the bus master to which the enabler is connected to contend for the system bus control right, based on the priority scheme determined by priority arbiter 100. The "on" register accomplishes this by always passing the corresponding bus request signal to the priority arbiter 100.

When the register 118 is set "off," however, the bus master to which the enabler is connected cannot interrupt another bus master, even one of lower priority. Nonetheless, the bus master to which the enabler is connected may still contend for the system bus control right where the system bus has not already been acquired by another bus master, as indicated by the bus busy control signal 48. It should be appreciated that other realizations of the logic function implemented in circuit 104 may be employed without departing from the spirit and scope of the invention.

Figure 6:
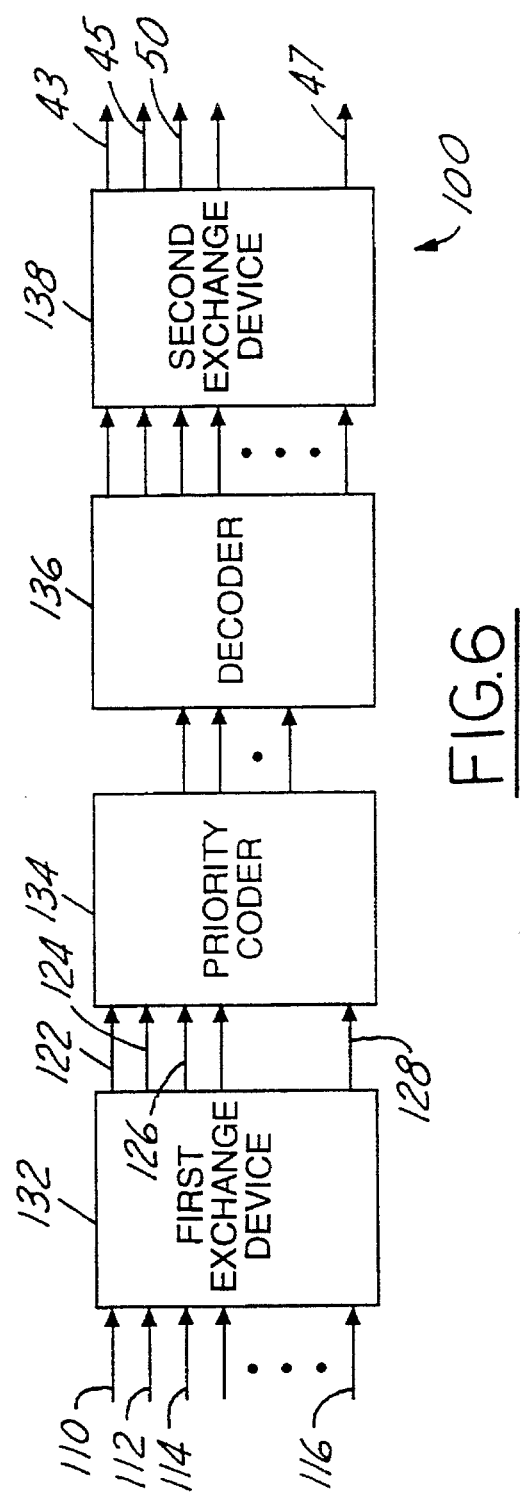
FIG. 6 is a partial block diagram view showing in greater detail the priority arbiter depicted in FIG. 4.

Referring to FIG. 6, priority arbiter 100 includes a first exchange device 132, a priority coder 134, decoder 136, and a second exchange device 138. In order to change the priority order of each bus master, it is necessary to go through the CPU or Operating System (OS) to input desired routing data into first exchange device 132, and corresponding second exchange device 138. Priority coder 134 will accept the priority code from exchange device 132 and its changed corresponding position. The higher the position, the higher the priority rights, for example, position 128>126>124>122 as shown in FIG. 6. After being decoded by decoder 136, only the highest priority corresponding position is then delivered to the exchange device 138 to activate the correct bus enable line in accordance with the determined highest priority bus master.

The operation of bus arbiter 41' will now be described. Assume that there exists a predetermined bus priority order such that bus master n>bus master 3>bus master 2>bus master 1. Further assume that for enabler 106, register 118 is masked "on," while for enablers 102, 104, and 108, a respective register 118 is masked "off." Accordingly, with such masking, when bus busy signal 48 indicates that the system bus control right has already been acquired, enabler 106 can deliver $BRQ_3$ 49 to $IBRQ_3$ 114, but the other enablers cannot deliver $BRQ_1$ 42, $BRQ_2$ 44, and BRQn 46 to $IBRQ_1$ 110, $IBRQ_2$ 112, and IBRQn 116, respectively. Based on the foregoing assumptions, multi-level bus arbiter 41' would operate in the following manner: when no bus master has control of the system bus, the bus busy signal 48 is not asserted, and, effectively, for any bus master that sends out a bus request, the respective enabler will send the corresponding bus request signal to priority arbiter 100. Arbiter 100 then determines which bus master has the priority to acquire the system bus control right, and will respond to activate the corresponding bus enable line.

Figure 7:
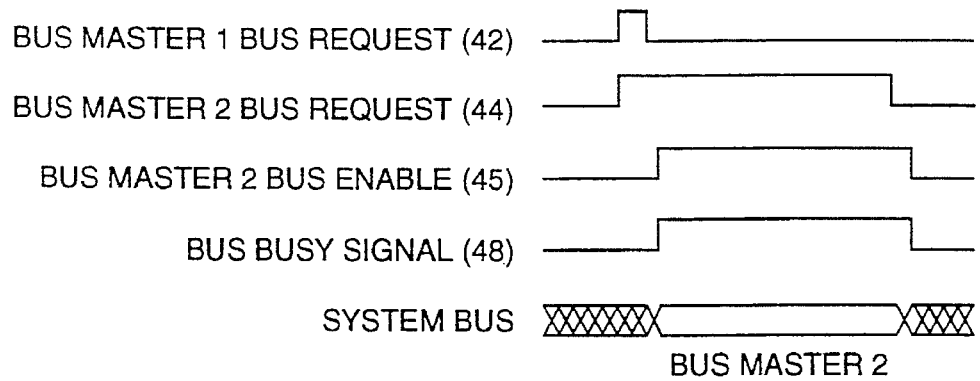
FIG. 7 is a partial timing chart depicting the operation of the multi-layer bus arbiter shown in FIG. 4, particularly the operation of the priority scheme.

Referring now to FIG. 7, when bus master 1 and bus master 2, simultaneously send out bus requests $BRQ_1$ 42, and $BRQ_2$ 44, respective enablers 102 and 104 pass the bus requests to the priority arbiter 100. The arbiter 100 will then respond by activating the $BEN_2$ 45 line to indicate that bus master 2 has the system bus control right, since, based on the foregoing assumptions, bus master 2 has a priority higher than that of bus master 1. With bus enable line $BEN_2$ 45 activated, the communication coordinator 82 (which may take the form of a logic OR gate or other similar logic gate combination) responds by setting the bus busy signal 48. As a consequence of the bus busy signal 48 being activated, and the foregoing assumption that enablers 102, 104, and 108 are masked "off," bus master 1, bus master 4, . . . , bus master n can no longer obtain or acquire the system bus control right until bus master 2 completes its tasks and releases the system bus. When this release occurs, the bus enable signal $BEN_2$ 45 is deactivated, thereby causing bus busy signal 48 to also be deactivated, thereby freeing the system bus control right for any bus master to acquire. It should be appreciated, however, that bus master 3 is not limited by the fact that the bus busy signal 48 is active, since its mask register is set "on."

Figure 8:
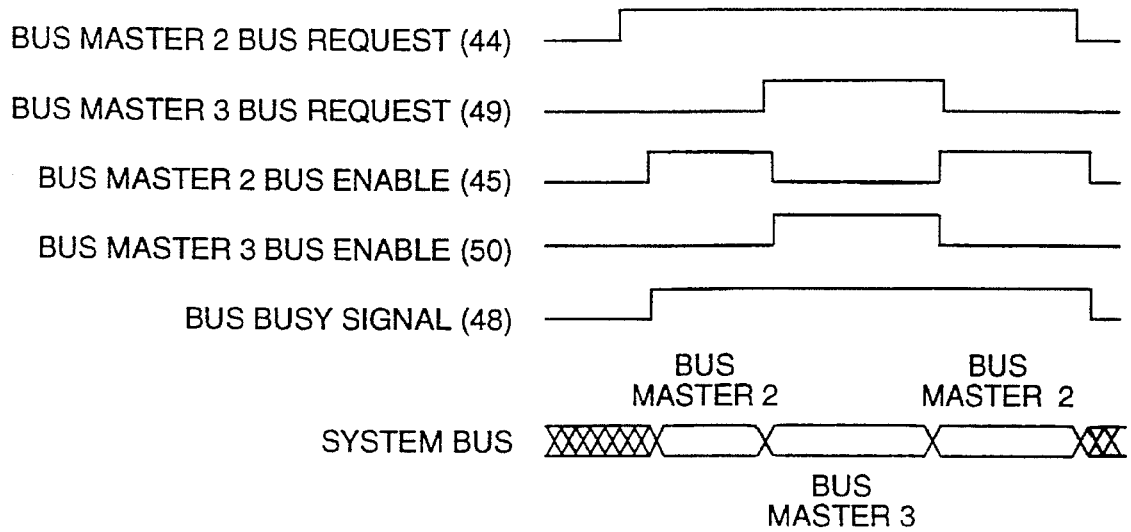
FIG. 8 is a timing chart showing the operation of the multi-layer bus arbiter of FIG. 4, particularly showing a higher priority bus master interrupting ownership of the system bus control right by a lower priority bus master.
Figure 9:
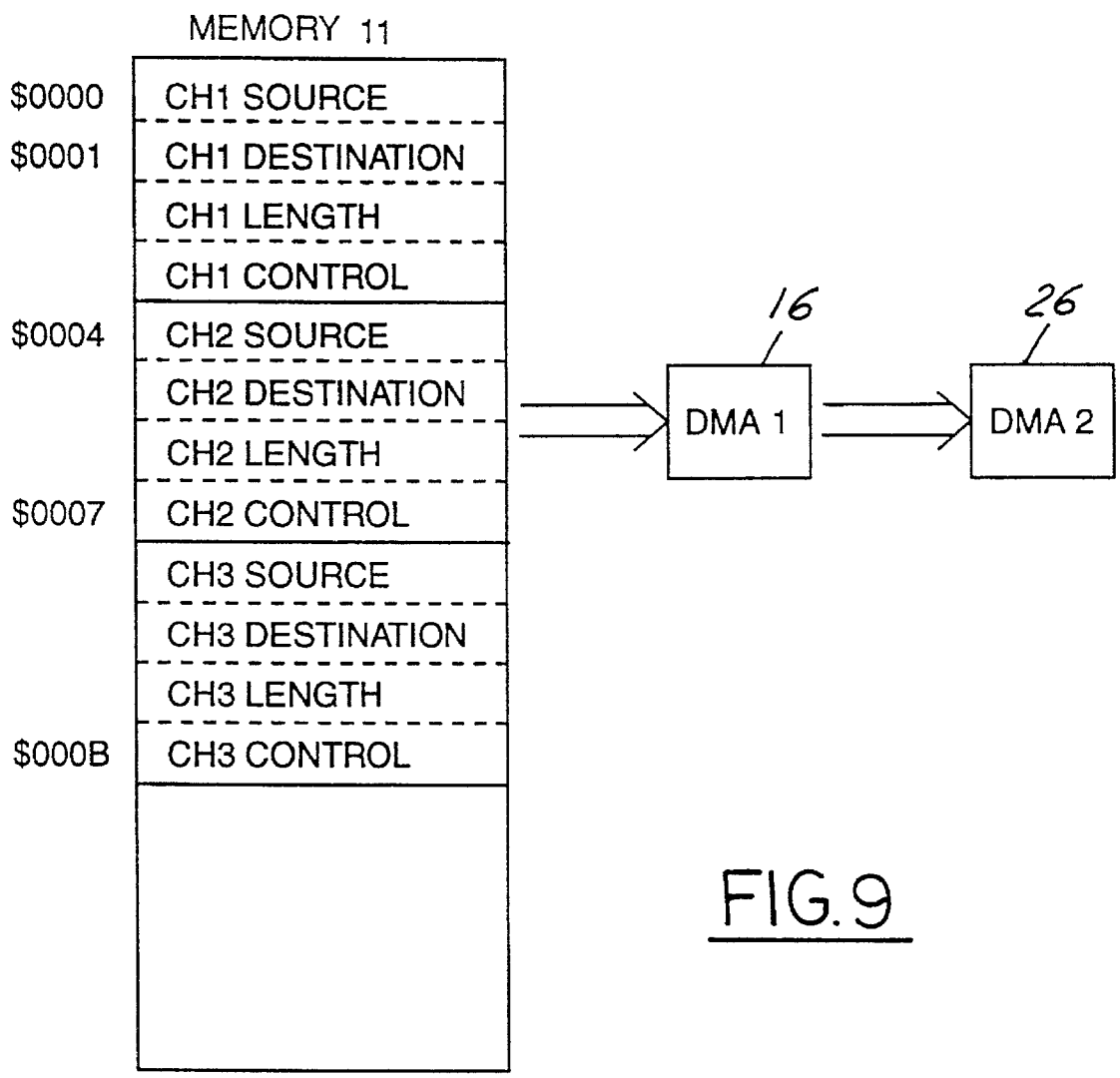
FIG. 9 shows an exemplary partial memory map of a 3 channel DMA.

Referring now to FIG. 8, bus master 3 can generate a bus request signal BRQ3 49 to acquire the system bus notwithstanding bus master 2's control of the bus. The bus request signal $BRQ_3$ 49 is transmitted through enabler 106 and further delivered to priority arbiter 100 to contend for the system bus control right which is now owned by bus master 2. It should be appreciated that the bus busy signal 48 does not prohibit the transfer of the bus request signal $BRQ_3$ 49 to arbiter 100. Since the bus master 3 has a higher priority than the bus master 2, arbiter 100 disables $BEN_2$ 45, and then activates bus enable line $BEN_3$ 50. The transfer of the bus enable signal indicates that the system bus control right has been delivered by bus master 2 to bus master 3. Concurrently, bus busy signal 48 maintains its active state, as shown in FIG. 8, in order to achieve, in the preceding description, a two-layer bus control right transition effect.

Referring now to FIGS. 1, 2, 3 and 9, the operation of the inventive n-dimensional m-channel DMA, employing a virtual array technique and utilizing a multi-layer bus arbiter, will be described for a 3 channel DMA.

Assume for purposes of illustration only, the following parameters:

| | |
|---|---|
| Source center 51 address for $DMA_1$ 16 = | $F000 |
| Destination counter 52 address for $DMA_1$ 16 = | $F001 |
| Length counter 53 address for $DMA_1$ 16 = | $F002 |
| Control register 54 address of $DMA_1$ 16 = | $F003 |
| Source counter 51 address for $DMA_2$ 26 = | $F010 |
| Destination counter 52 address for $DMA_2$ 26 = | $F011 |
| Length counter 53 address for $DMA_2$ 26 = | $F012 |
| Control register 54 adress for $DMA_2$ 26 = | $F013 |
| Channel 1 (CH1) parameters (source, destination, length, control) stored in memory 11 at addresses | $0000–$0003 |
| Channel 2 (CH2) parameters (source, destination, length, control) stored in memory 11 at addresses | $0004–$0007 |
| Channel 3 (CH3) parameters (source, destination, lenth, control) stored in memory 11 at addresses | $0008–$000B. |

To begin operation of a 3 channel DMA, a CPU or other bus master initializes $DMA_1$ 16 over the system bus by performance of the following:

Writing data $0000 at address $F000 (source counter $DMA_1$)

Writing data $F010 at address ,F001 (destination counter of $DMA_1$)

Writing data $0B at address $F002 (length counter of $DMA_1$)

Writing data $XX at address $F003 (control register of $DMA_1$), where XX is a value sufficient to place $DMA_1$ in a cascade mode by presetting the CCM bit, and further is sufficient to set the above-described "starting" bit to start $DMA_1$ to obtain the system bus control right. Further, LCE bit, DCE bit, and SCE bits are set high.

When $DMA_1$ 16 is started, the timing sequence circuit 56 of $DMA_1$ 16 sends out a signal $BRQ_1$ 42 to multi-layer bus arbiter 41. The arbiter 41 then sends back a response signal $BEN_1$ 43 such that $DMA_1$ 16 obtains the system bus control right. It should be appreciated that the starting address of the parameters for the m-channel DMA stored in memory 11 (i.e., the virtual array) is stored in source counter 51 of $DMA_1$ 16 because of the above-described initialization procedure. Further, since $DMA_1$ 16 is set in a cascade mode, multiplexer 73 of destination counter 52 will select the output of fixed counter 72 to properly address the counters and registers of $DMA_2$ 26.

When DMA$_1$ 16 obtains control of the system bus, timing sequence circuit 56 provides signal DRW 65 to control multiplexer 55 to select the address output by source counter 51—namely, $0000— for transmission to the system address bus. Address $0000 on the address bus accesses location $0000 of memory 11, which contains the CH1 source address. The CH1 source address is then read by DMA$_1$ 16 from memory 11 and is stored, temporarily, in data register 57.

Next, circuit 56 controls multiplexer 55 to select the output of destination counter 52 for output onto the system address bus. Since DMA$_1$ 16 is in a series or cascade mode, the output of counter 52 is the output of fixed counter 72 which has a value of F010. This value, when placed on the address bus, selects or accesses the source counter of DMA$_2$ 26. The CH1 source address stored in data register 57 is then written by DMA$_1$ 16 into the source counter 51 of DMA$_2$ 26. The source counter and destination counter of DMA$_1$ 16 are then incremented, while the length counter of DMA$_1$ 16 is decremented. DMA$_1$ 16 then repeats the above-described read/write cycle to transfer the CH1 destination address (stored at memory location $0001) and CH1 length (stored at memory location $0002) into destination counter 52 and length counter 53 of DMA$_2$ 26, respectively.

DMA$_1$ 16 then performs a fourth read/write cycle to transfer the CH1 control parameter (stored at memory location $0003) into control register 54 of DMA$_2$ 26. The value of the CH1 control parameter is such that DMA$_2$ 26 is placed in a normal mode (i.e., not a cascade mode) by appropriate setting of the CCM bit, and sufficient to set the above-described "starting" bit. By these actions, the necessary parameters for the first channel CH1 are all delivered to the respective counters and register of DMA$_2$ 26. At the same time, the fixed counter 72 of destination counter 52 will return to its starting value (i.e., $F010 in this example) so that parameters for channel 2 can be accurately delivered to the respective counters and registers of DMA$_2$ 26 in the next start up of DMA$_1$ 16. Since CH1 control parameter is set to activate the "starting" bit, timing sequence circuit 56 of DMA$_2$ to send out a signal BRQ$_2$ 44 to arbiter 41 when CH1 control is written into control register 54 of DMA$_2$ 26.

The multi-layer bus arbiter 41 first disables BEN$_1$ 43, and then sends a response BEN$_2$ 45 to DMA$_2$ 26 such that the system bus control right is shifted from DMA$_1$ 16 to DMA$_2$ 26. DMA$_2$ 26, once it obtains the system bus, undertakes and completes the DMA data transfer for CH1 in accordance with the CH1 DMA parameters stored in counters 51, 52, 53, and register 54 of DMA$_2$ 26.

As a result of following the instructions of source counter 51 of DMA$_2$ 26, which is loaded with the CH1 source address, a certain portion of memory 21 or device data from I/O device 21, as determined by the length parameter value, is transmitted via the system bus to a certain portion of memory 24 or to a certain I/O device 24 beginning with the parameter value stored in destination counter 52 of the DMA$_2$ 26. At the completion of the data transmission, the timing sequence circuit 56 of DMA$_2$ 26 cancels BRQ$_2$ 44. After detection by arbiter 41, BEN$_2$ 45 is first disabled and then BEN$_1$ 43 is enabled for DMA$_1$ 16, with the result that DMA$_2$ 26 no longer has the system bus control right wherein the system bus control right is returned to DMA$_1$ 16.

When DMA$_1$ 16 regains control of the system bus, the parameter group for the second channel (CH2) of the m-channels for DMA$_2$ 26 stored in memory 11 will be moved according to the method described above in connection with channel 1. The CH2 DMA parameter values are transferred from location $0004~$0007 to the source counter, destination counter, length counter, and control register of DMA$_2$ 26, respectively. It is through these actions that the necessary parameters for the second channel are transmitted completely to the counters and registers of DMA$_2$ 26. Similarly, since the last parameter of the second channel (CH2) is used to control the action mode value of DMA$_2$ 26 action, after it is written into control register 54 of DMA$_2$ 26, it, as with CH1 control, triggers timing sequence circuit 56 of DMA$_2$ 26 to send out signal BRQ$_2$ 44 to arbiter 41.

The multi-layer bus arbiter 41 will then disable BEN$_1$ 43 and send back a response of BEN$_2$ 45 to DMA$_2$ 26. This indicates that DMA$_2$ 26 has regained the system bus control right from DMA$_1$ 16. DMA$_2$ 26 then, based on the CH2 DMA parameter values stored in the respective counters and register, completes the DMA actions for the second channel (CH2) of DMA$_2$ 26.

A certain portion of memory 21 or device data from I/O device 21 is transmitted to a certain portion of memory 24 or to I/O device 24 through the system bus via DMA$_2$ 26.

After this operation is completed, the timing sequence circuit 65 of DMA$_2$ cancels BRQ$_2$ 44. After the cancellation is detected by arbiter 41, it disables BEN$_2$ 45 and then enables BEN$_1$ 43 to DMA$_1$ 16. This indicates that DMA$_2$ 26 no longer controls the system bus. After the system bus is returned to DMA$_1$ 16, the above-described action is continued a total of m times until every one of the groups of DMA parameters contained in memory 11 are transmitted to DMA$_2$ 26 for m-channels. In the described 3 DMA, this cycle is performed one more time for CH3. Furthermore, DMA$_2$ 26 acts m times (1.e., completes m DMA parameter data transfer operations) to achieve a one-dimensional m-channel action. After the CH3 DMA parameters have been transferred by DMA$_1$ 16 to DMA$_2$ 26, the length counter 53 of DMA$_1$ 16 will have been decremented enough times so that it is now equal to $00. DMA$_1$ 16 is programmed to recognize this fact and end its originally programmed DMA transfer. Thus, after DMA$_2$ 26 completes processing of CH3 of the 3 channel DMA and relinquishes control of the system bus, DMA$_1$ 16 does not contend to acquire the system bus control right—it has completed its programmed task.

The above example therefore illustrates the present invention in which n–1 dimensional m-channel DMA is constructed using n independent DMA (where n=2 in the example). When the first dimensional DMA has the functions of an independent m-channel DMA, it can be connected in series to form a n-dimensional m-channel DMA function. In the above example, when two independent DMA$_1$ 16 and DMA$_2$ 26 are connected in series to form a one-dimensional m-channel DMA, the functions of a 2-dimensional m-channel DMA apparatus can be achieved if DMA$_1$ has its own independent m-channel (i.e., if a group of m-channels have been defined for DMA$_1$ 16).

It should be appreciated that the effect of storing various m-channel groupings (having independently definable sources/destinations) in memory associated with an independent DMA structure provides the functionality of an n by m matrix or array of independent DMA structures; however, since our invention requires only n independent DMA structures to achieve the functionality of an n by m matrix of DMAs, we call it a virtual array type DMA apparatus. Thus, the use of a first dimensional DMA structure to transfer stored channel parameters, including independently definable source and destination addresses (unlike Motorola's MC68450), to other DMA structures and to activate such DMA structures for operation provides a n by m DMA function apparatus capable of transferring data from multiple sources to multiple destinations. The cascading structure is achievable in practice through the use of a multi-layer bus priority arbiter, such as the disclosed arbiter 41'.

While the present invention has been described in an illustrative manner, it should be understood that the terminology used is intended to be in a nature of words of description rather than of limitations.

Furthermore, while the present invention has been described in terms of a preferred embodiment thereof, it is to be appreciated that those skilled in the art will readily apply these teachings to other possible variations of the invention.

The embodiments of the invention in which an exclusive property or privilege is claimed are defined as follows:

1. An apparatus for performing direct memory access data transfers in a system of the type having a system bus, comprising:

a first direct memory access (DMA) means for transferring data from a first data source to a first data destination, said first DMA means generating a first bus request signal in response to a first start condition;

a second DMA means being operatively coupled in series to said first DMA means and having a plurality of m-channels associated therewith, where m is an integer, for transferring data from a second data source to a second data destination, said first DMA means further having means for addressing said second DMA means when said first DMA means is in a series mode, said second DMA means generating a second bus request signal in response to a second start condition; and, a multi-layer bus arbiter responsive to said first and second bus request signals for generating a bus enable signal corresponding to the highest priority bus request signal, said bus enable signal indicating that a corresponding DMA means is enabled to obtain a system bus control right;

said first DMA means being responsive to a system bus master to place said first DMA means in a series mode and to establish said first starting condition for transferring DMA parameters for each one of said m-channels from said first data source to said second DMA means when said arbiter awards said first DMA means said system bus control right, said transfer of certain DMA parameters placing said second DMA means in a normal mode and establishing said second starting condition; and said bus arbiter transferring said system bus control right to said second DMA means for completing a direct memory access data transfer in accordance with said transferred DMA parameters.

2. The apparatus of claim 1, wherein said first DMA means comprises:

a control register for storing DMA control parameters including an action mode of said first DMA means; and, a control circuit comprising:

a first multiplexer having an output coupled to an address bus of said system bus;

a source counter having an output address coupled to said first multiplexer;

a destination counter having an output address coupled to said first multiplexer;

a length counter for determining the amount of data to be transferred by said first DMA means;

a data register for storing data read by said first DMA means; and, a timing sequence circuit for generating said bus request signal and for controlling the generation of read and write cycles; and, said first multiplexer being responsive to said timing sequence circuit and including means for selecting one of said source counter output and said destination counter output to be outputted to said address bus, said first multiplexer selecting said source counter output when said first DMA is in said read cycle, said multiplexer selecting said destination counter output when said first DMA is in said write cycle.

3. The apparatus of claim 1, wherein said multi-layer bus arbiter comprises:

a priority arbiter for determining when more than one bus request signal is present, and for awarding the system bus control right to DMA means corresponding to the highest priority bus request signal presented to said priority arbiter; and, a communication coordinator for interfacing with a communication protocol of said system bus.

4. The apparatus of claim 2, wherein said control register comprises:

a cascade mode bit for controlling said first DMA means in said normal mode in a first state, and in said series mode in a second state, said first DMA means being operative, in said series mode, to write DMA parameters into said second DMA means; and, a starting bit for defining said action mode and for causing said first DMA means to generate said first bus request signal to thereby contend for ownership of the system bus control right.

5. The apparatus of claim 2, wherein said object counter includes:

a programmable counter having an output whose initial value is programmed by the system bus master for addressing said first data destination when said first DMA means is in said normal mode;

a fixed counter having an output whose initial value is programmed by the system bus master for addressing said second DMA means when said first DMA means is in said series mode; and, a second multiplexer for selecting said programmable counter output when in said normal mode and said fixed counter output when in said series mode.

6. The apparatus of claim 2, wherein said control register, and said source, destination and length counters are operatively coupled with the system bus, and being of the type wherein a bus master in control of the system bus can load predetermined DMA parameters therein.

7. The apparatus of claim 3, wherein said priority arbiter comprises:

a priority coder coupled to bus request signals for determining and outputting a code indicative of the highest priority active bus request signal; and, a decoder responsive to said code for activating a selected one of a plurality of bus enable lines.

8. The apparatus of claim 1 wherein said first DMA means has associated therewith m independent DMA channels to thereby form an n-dimensional, m-channel DMA function apparatus, where n is an integer equal to the number of independent series-connected DMA means.

9. A method of implementing an n-dimensional, m-channel DMA function using n series-connected DMA structures, where n is an integer greater than 1, comprising the steps of:

(A) establishing, for each independent DMA structure, DMA parameter values for m-channels in a memory to define an n×m virtual array;

(B) generating a first bus request signal using a first dimensional DMA structure to obtain ownership of the system bus;

(C) transferring, using the first dimensional DMA structure, DMA parameter associated with the m-channels of a next dimensional DMA structure, to the next dimensional DMA structure;

(D) generating a second bus request signal using the next dimensional DMA structure in response to certain of the DMA parameters transferred in step (C);

(E) transferring ownership of the system bus from the first dimensional DMA structure to the next dimensional DMA structure using a bus arbiter;

(F) transferring data using the next dimensional DMA structure in accordance with the DMA parameters transferred in step (C);

(G) transferring ownership of the system bus from the next dimensional DMA structure to the first dimensional DMA structure using the bus arbiter upon completing DMA transfers for all of the m-channels associated with the next dimensional DMA structural; and, (H) transferring data using the first dimensional DMA structure for the m-channels established in the memory.

10. The method of claim 9, wherein step (G) includes the substep of:

transferring ownership of the system bus from the next dimensional DMA structure to the first dimensional DMA structure using the bus arbiter upon completing each of the m-channels associated with the next dimensional DMA structure.

* * * * *